United States Patent Office 2,968,330
Patented Jan. 17, 1961

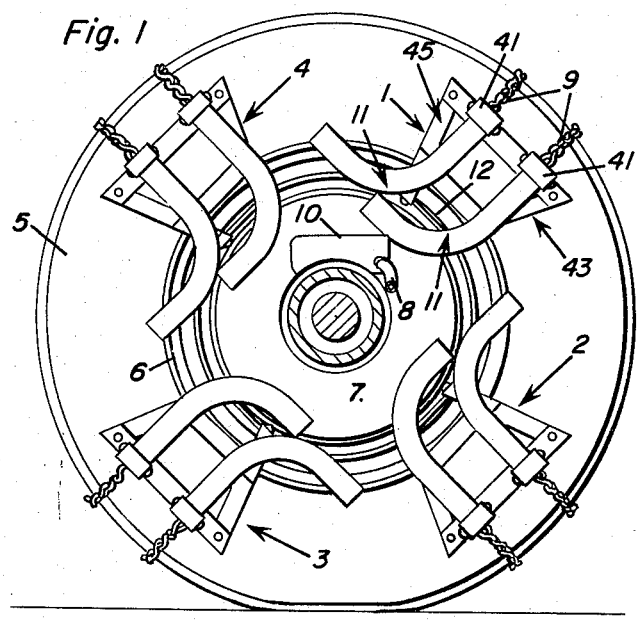

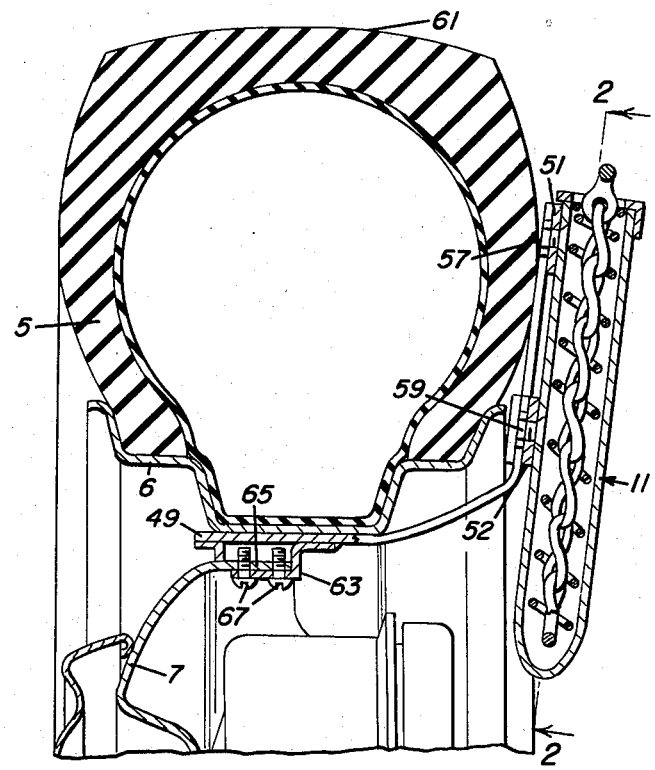
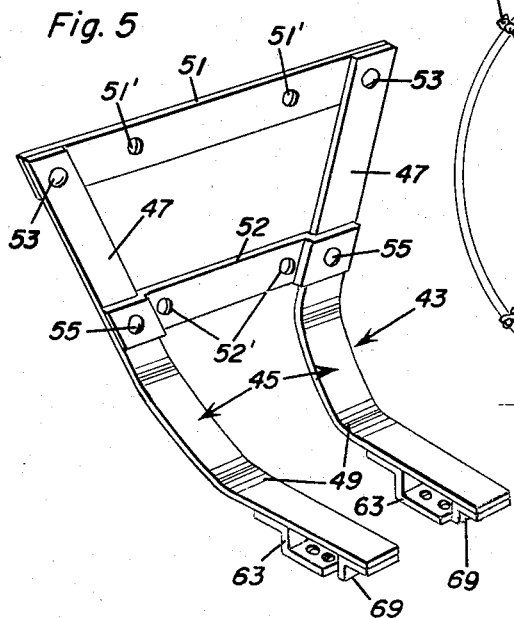
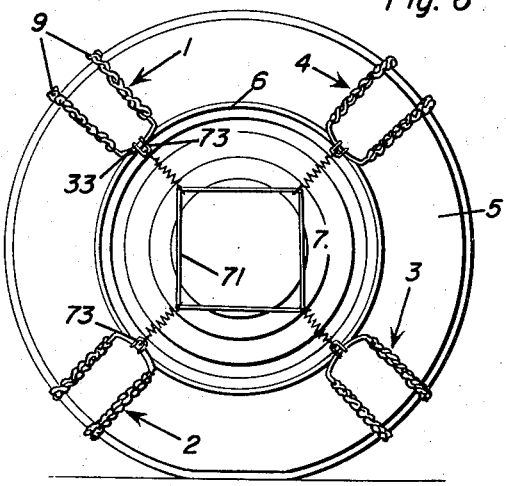

2,968,330
ANTI-SKID CHAIN DEVICES FOR AUTOMOBILE TIRES

Donald T. Brown, 1610 1st St., Rensselaer, N.Y.

Filed Oct. 12, 1959, Ser. No. 845,967

5 Claims. (Cl. 152—216)

This invention relates to anti-skid chain devices for tires of automobile wheels.

The principal object of the invention is to provide anti-skid cross chains for automobile wheels mounted under tension on the rear side of an automobile wheel for extension across a tire into operative position and retraction into inoperative hidden, housed, out-of-the-way position when use thereof is not required.

Another object is to provide, in conjunction with the foregoing, means for mounting and housing the anti-skid chains on the rear side of an automobile wheel, which will not require any change or alteration in the automobile wheel, and will not rattle, chatter, work out of position or interfere with adjacent parts of the automobile, or of the wheel.

Other objects are to provide anti-skid chain devices according to the foregoing and mounting and housing means therefore of simple, inexpensive, and durable construction readily attachable to and detachable from conventional disk-type automobile wheels.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a view in rear side elevation of an automobile wheel having sets of the anti-skid chain devices of this invention mounted thereon with the anti-skid chains extended across the tire into operative position;

Figure 2 is an enlarged fragmentary view in longitudinal section taken through one of the sets of anti-skid chain devices on the line 2—2 of Figure 3;

Figure 3 is a view in cross-section taken on the line 3—3 of Figure 2;

Figure 4 is an enlarged view in cross-section taken on the line 4—4 of Figure 2;

Figure 5 is an enlarged perspective view of a mounting bracket forming part of the mounting or attaching means; and Figure 6 is a view in front side elevation, drawn on a smaller scale, of the automobile wheel having the sets of anti-skid chain devices of this invention mounted thereon and with the anti-skid chains in operative position.

Referring to the drawings by numerals, according to this invention, sets of anti-skid chain devices are provided for mounting on the rear side of an automobile wheel 7 in circumferentially spaced, substantially equidistant relation on said wheel 7, there being, preferably, although not necessarily, four such sets designated generally 1, 2, 3, 4. The wheel 7, as shown, is of the usual disk-type with a drop center rim 6 for a tire 5 and having a line 8 extending out of a brake cylinder 10 of the wheel 7, and also having the usual circumferentially spaced elongated openings, as at 12, between points of attachment of the rim 6 to the wheel 7. The sets 1, 2, 3, 4 are all alike, and accordingly a description of one set will suffice for all.

Each set, for instance, that designated by the numeral 1, comprises a pair of side-by-side anti-skid cross chains 9 of the conventional link type normally retracted into a pair of tubular J-shaped, coplanar housings 11 having outer straight end portions 13 extending in laterally spaced relation transversely of the rim 6 and tire 5 of the wheel 7, and also having inner straight-end portions 19 extending generally circumferentially of the wheel 7 so that the housings 11 are positioned close to the wheel 7. The housings 11 form sheathes with closed inner ends 21 and open outer ends 23, and said housings are generally oval in cross-section to fit close to the wheel 7, with the outer end portions 23 spaced apart circumferentially of said wheel 7.

The pair of anti-skid cross-chains 9 are connected by rear end terminal links 25 thereon to the center of a pair of follower disks 27 fitting transversely in the housings 11 for movement longitudinally thereof. Preferably the terminal links 25 are swivelled in the disks 27 with the retaining ball ends 29 thereon. Front end links 31 of the pair of anti-skid chains 9 are connected together by a concavo-convex bridge rod 33 swivelled thereon and forming a hand grip whereby the pair of anti-skid chains 29 may be pulled outwardly of the housings 11 and extended from said housings over and across the tire 5 and downwardly in front of the front side of the wheel 7.

A pair of J-shaped guide rods 35 for the follower disks 27 and the pair of anti-skid chains 9 are provided in each housing 11 and which conform in shape longitudinally to said housing and are spaced from the wall of the housing parallel therewith. These guide rods 35 guidingly confine the anti-skid chains 9, when said chains are retracted, between the pairs of guide rods 35 and prevent said chains from kinking in said housings. Each pair of guide rods 35 is suitably fixed at an inner end thereof to the inner end 21 of its housing 11 with outturned ends 37 fixed between screws 39 in the outer ends 23 of the housings 11 and an annular cap member 41 of right angle cross-section fixed on the outer end 23 by screws 39. The follower disks 27 are notched, as at 28, to straddle and slide on the guide rods 35.

A pair of coil tension springs 42 with oval coils surround the pair of guide rods 35 in the pair of housings 11 and are interposed between the follower disks 27 and the outer ends 37 of the guide rods 35 to retract the follower disks 27 into the inner end portions 19 of the housings 11 and thereby retract the anti-skid chains 9 into the housings 11 into inoperative position as best shown in Figures 2 and 3.

The housings 11 of the set 1 of anti-skid chain devices are detachably attached to the wheel 7 by means of a mounting bracket designated generally by the numeral 43.

The mounting bracket 43 comprises a pair of side-by-side bars 45 of angular, substantially L-shape, having outer end portions 47 extending transversely of the rim 6 and of the rear side of the tire 5, and inner end portions 49 extending transversely through one of the openings or slots 12 in the wheel 7 and fitting flat against the inner face of the rim 6 within said rim. The side bars 45 converge toward the inner end portions 49 to adapt said inner end portions 49 to be extended through and fit in the opening, or slot, 12.

A pair of cross-bars 51, 52 connect the outer end portions 47 of the side bars 45 and are secured thereto, as by bolts 53, 55. Suitable bolts 57, 59 extending through bolt holes 51′, 52′ in the cross-bars 51, 52 and into the housings 11 secure said housings 11 to said mounting bracket 43. As will be seen, the mounting bracket 43 attaches the housings 11 at a substantial distance inwardly from the tread 61 of the tire 5 so that the housings will not engage the ground when the tire 5 flexes, under the weight of a load. As will also be obvious, the side bars 45 of the mounting bracket 43 may be made of resilient metal to flex outwardly of the tire 5 to compensate for outward bulging of the tire.

A pair of right angled keepers 63 on the inner end portions 49 of the side bars 45 underlap and fit against the usual circumferential edge portion 65 of the disk wheel 7 at the opening 12 and are bolted to said edge portion by screw bolts 67. Thus, the inner end portions 49 and the keepers 63 attach said portions 49 to the wheel 7 with said inner end portions 49 engaging flatly with the inner face of the rim 6. A pair of transverse angle iron spacer bars 69 on the inner end portions 49 of said bars 45, and which are spaced from the keepers 63, rest on the edge portion 65 to act, together with the keepers 63, to hold said inner end portions 65 parallel with the inner face of the rim 7.

As will now be seen, the pairs of anti-skid chains 9 may be pulled out of the housings 11 from retracted, inoperative and hidden position at the rear side of the wheel 7, and extended across the tire 5 and downwardly at the front side of the wheel 7 into operative position, and during this extension operation the follower disks 27 will be pulled by the anti-skid chains 9 to slide outwardly of the housings 11 and compress the coil springs 42 so that the chains 9 will be extended into operative position in opposition to increasing tension exerted by said springs 42. When the anti-skid chains 9 are fully extended, and as shown in Figure 6, the conventional endless anti-skid chain fastener 71 may be used to hold said chains 9 extended and in operative position by releasable fastening, spring-loaded hooks 73 on said fastener 21, hooking over the bridge 33. Obviously, when the bridge rods 33 are released by releasing the hooks 73, the coil springs 42 will expand and retract the follower disks 27 inwardly of the housings 11 to retract the anti-skid chains 9 into housed, out-of-the-way, hidden position at the rear side of the wheel 7, as best shown in Figure 2.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An anti-skid chain device comprising a pair of laterally spaced tubular housings, bracket means for attaching said housings to an automobile wheel at one side thereof, a pair of anti-skid chains in said housings slidably extensible out of the same from a retracted inoperative position into an advanced operative position across a tire on said wheel, handle forming means terminally connecting said chains outwardly of said housings for pulling on and extending the chains, and spring means in said housings opposing extension of said chains and retracting the same from extended position, guide means in said housings for said chains spacing said chains from said housings.

2. The combination of claim 1, said spring means comprising helical tension springs in said housings surrounding said chains, and followers on said chains tensioned by said chains when said chains are retracted and compressing said springs in response to extension of said chains.

3. The combination of claim 1 and pairs of guide rods for said chains fixed in said housings, said pairs of guide rods confining the pairs of chains therebetween in spaced relation to said housings.

4. The combination of claim 3, said spring means comprising helical tension springs in said housings having coils surrounding the pairs of guide rods and slidable thereon.

5. The combination of claim 4 and followers on said chains riding between said pairs of guide rods and compressing the springs in the housings in response to extension of said chains.

References Cited in the file of this patent

UNITED STATES PATENTS

| | | |
|---|---|---|
| 1,409,940 | Forrest | Mar. 21, 1922 |
| 2,754,874 | Gardner | July 17, 1956 |
| 2,904,094 | Raber | Sept. 15, 1959 |